Figure 1:
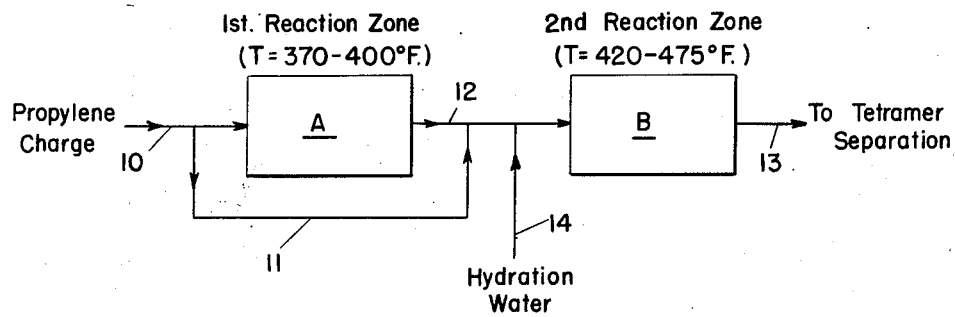

Aug. 13, 1957 C. H. BROOKS 2,802,890
POLYMERIZATION OF PROPYLENE
Filed Sept. 15, 1954

INVENTOR.
CHARLES H. BROOKS
BY
Busser and Harding
ATTORNEYS

United States Patent Office 2,802,890
Patented Aug. 13, 1957

2,802,890

POLYMERIZATION OF PROPYLENE

Charles H. Brooks, Swarthmore, Pa., assignor to Sun Oil Company, Philadelphia, Pa., a corporation of New Jersey Application September 15, 1954, Serial No. 456,198

2 Claims. (Cl. 260—683.15)

This invention relates to the polymerization of propylene and more particularly to propylene polymerization reactions which are conducted in a plurality of separate reaction zones containing phosphoric acid polymerization catalysts.

It is well known that propylene can be polymerized by means of a phosphoric acid catalyst to produce valuable liquid products. This type of polymerization has been practiced commercially to form dimer and trimer products which are useful in the preparation of motor fuel. Propylene tetramer has also been produced for use as an alkylating agent in manufacturing detergents by alkylation of aromatic hydrocarbons. The catalyst generally used in promoting these reactions is composed of phosphoric acid carried on a granular inert siliceous material such as Kieselguhr and is often referred to in the art as solid phosphoric acid catalyst.

Commercial operations for polymerizing propylene usually involve the use of a plurality of catalytic reactors in each of which the polymerization catalyst is maintained in stationary form. The reactors are specially designed to provide means for removing the heat of reaction in order to maintain the desired temperature within the reaction zone and also to provide for removal and replacement of the catalyst as its activity drops to an uneconomic level upon extended use. One suitable type of reactor design employing tubes in which the catalyst is disposed which has had commercial use is disclosed in Banks Patent No. 2,244,599.

Customary commercial procedure for polymerizing propylene to its dimer and trimer products for use in motor fuel comprises operating the catalytic reactors in parallel by feeding propylene charge to each and reacting it in each zone under conditions effective to yield mainly dimer and trimer polymers. The combined reaction product from the several reactors is subjected to distillation to remove unreacted $C_3$ hydrocarbon and to separate the dimers and trimers from minor amounts of higher boiling polymers. When it is desired to operate the plant to obtain increased yields of tetramer product for use in making detergents, the usual practice is merely to recycle a major portion of the separated dimer and trimer products to the catalytic reactors for interpolymerization with the incoming propylene charge. Such recycling procedure is disadvantageous for the reason that different reaction conditions should be used on the one hand to form the intermediate polymers and on the other hand to produce tetramer by further reaction of these intermediate polymers with propylene. The best conditions for promoting the last-mentioned reaction tend to cause the formation of intermediate polymers having a molecular structure apparently not suitable for yielding the kind of tetramer which is best for detergent manufacture. On the other hand, the conditions that are best for the formation of intermediate polymers having the proper structure for this purpose are not favorable for promoting the final step of the reaction. When operating in the described customary manner the conditions for effecting each stage of reaction—that is, for polymerizing propylene to the intermediate polymers and for reacting the intermediate polymers with additional propylene to yield the desired tetramer—of necessity must be the same, as the reactions occur concurrently in each of the several reactors.

The present invention is directed to an improved method of operation for producing propylene tetramer suitable for use in the manufacture of detergents and alternately producing dimer and trimer products for use as motor fuel. One feature of the invention which is applied during the time when such tetramer is being made comprises splitting the propylene charge stream into two fractions one of which represents 50–95%, preferably 75–95%, of the total charge, reacting said one fraction in a first polymerization zone under hereinafter specified conditions to yield mainly dimer and trimer products of the desired kind, combining the effluent from the first polymerization zone with the remaining fraction of the charge stream and reacting the mixture in a second polymerization zone under other hereinafter specified conditions to yield mainly the desired tetramer product. This procedure permits of a more effective utilizatiton of the available catalytic reactor capacity in promoting the desired reactions and dispenses with any recycling of reaction products back to the reaction zones as in prior practice.

In a more specific aspect the invention embraces an improved method of conducting a propylene polymerization operation in which it is desired to produce, during a given operating time, both propylene tetramer for use in detergent manufacture and lower boiling propylene polymers for use in making motor fuel. The method involves the following sequential operational phases:

(1) splitting the propylene charge stream into two fractions as specified above, reacting said one fraction under hereinafter specified conditions in a polymerization zone A which contains catalyst whose activity has become relatively low due to previous use, combining the effluent from zone A with the other fraction of charge and reacting the mixture under hereinafter specified conditions in a polymerization zone B which contains catalyst of relatively high activity to produce mainly tetramer product;

(2) stopping the operation of zone A and replacing the catalyst therein with catalyst of relatively high activity while continuing the operation of zone B by reacting therein propylene charge alone under hereinafter specified conditions to produce mainly dimer and trimer products, then operating zones A and B in parallel on propylene charge alone under conditions to produce mainly dimer and trimer products as hereinafter specified;

(3) then, when the catalyst activity in zone B has become relatively low, conducting the operation of zones A and B so that each operates in the manner of, and under the conditions specified for, the other zone in phase (1);

(4) and thereafter conducting the operation such that each of zones A and B operates in the manner of, and under the conditions specified for, the other zone in phase (2).

The foregoing sequential operational steps result in the most efficient utilization of the polymerizing capacity of a plant for producing given amounts of both tetramer for use in detergent manufacture and lower boiling polymers for use as motor fuel during a given time period.

Figure 2:
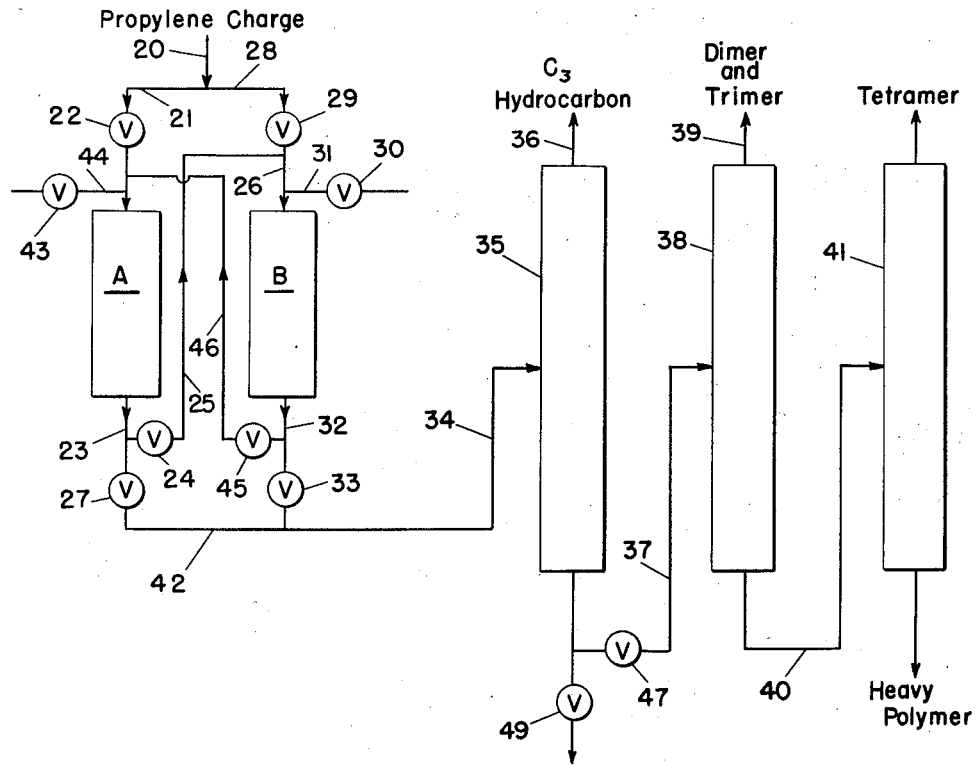

The following detailed description of the invention is made with reference to the accompanying drawings in which Figure 1 schematically illustrates the procedure of producing tetramer by splitting the propylene charge and reacting in the manner above specified and Figure 2 is a diagrammatic illustration of the foregoing method involving sequential operational phases for producing tetramer and lower boiling polymers.

The propylene charge stock to be polymerized in accordance with the invention generally will be a refinery C₃ fraction containing propane in addition to propylene. Preferably the charge contains at least 25% propylene, but it is desirable that the propylene content of the feed to the reaction zone does not exceed 60% as otherwise the reaction temperature may be difficult to control properly.

With reference to Figure 1, the preparation of propylene tetramer includes two stages of reaction, namely, the polymerization of propylene to dimer and trimer products of suitable molecular structure and the reaction of such products with additional propylene to yield the desired tetramer. The first of these reactions is effected in a first reaction zone A, while the other is carried out in a second reaction zone B. The propylene charge, which enters the system through line 10, is split into two streams one of which generally constitutes 75–95% of the total charge. This stream is introduced into reaction zone A and is therein polymerized under conditions effective to produce mainly dimer and trimer products. The other stream passes through line 11 and then joins the effluent leaving zone A via line 12. The mixture is then introduced into zone B and therein reacted under conditions effective to yield mainly the desired tetramer product. The effluent leaving zone B through line 13 is sent to a separation zone wherein the tetramer product is separated from lower and higher boiling constituents.

Where the reactors constituting zones A and B are of the same size, the fraction of the propylene charge sent to zone A generally should be within the range of 75–95% of the total charge. However, in certain instances where the reactors have substantially different sizes, the fraction sent to zone A may be lower than 75% but in any event will be at least 50% of the total charge.

Zones A and B each contain a solid phosphoric acid catalyst, but the reaction conditions within the two zones are different. In zone A the reaction temperature is kept within the range of 360–390° F., preferably 375–385° F., and the catalyst is maintained at a relatively low degree of hydration. By this is meant that the operation of zone A is conducted without the addition of water other than that normally present in the charge stock. The usual propylene stocks are prepared in a refinery by distillation in the presence of steam and normally contain a small amount of dissolved water which hydrates the phosphoric acid catalyst in zone A but only to a relatively low degree. Such low hydration is an important factor, in addition to temperature as specified above, for promoting the desired reaction in zone A so as to produce those intermediate polymers which are most suitable for further conversion in zone B to tetramer. While the use of a catalyst of high hydration and of temperatures above the range of 360–390° F. would result in the formation of dimer and trimer polymers in zone A, these resulting intermediate polymers would be of a type not especially suited for further conversion into the desired tetramer. Consequently, maintenance of a relatively low hydration level for the catalyst and of the reaction temperature as specified are particularly important features of the process.

The reaction temperature in zone B, on the other hand, is held within the range of 420–475° F. and preferably within the range of 430–450° F.; and the catalyst has a relatively high degree of hydration. The latter condition is maintained by adding water to the reactant stream entering zone B so as to increase the water content of the hydrocarbon atmosphere adjacent the catalyst. Means for introducing water are diagrammatically illustrated in Figure 1 as line 14. The amount of water that need be added to maintain hydration at the desired high level is very small compared to the reactant rate, but should be at least one liquid volume per 10,000 liquid volumes of hydrocarbon introduced into reaction zone B. Typically, 2–3 volumes of water for each 10,000 volumes of hydrocarbons is used. Such amount of added water will sufficiently modify the phosphoric acid catalyst to render it effective, at the temperature specified for zone B, for causing the intermediate polymers from zone A and propylene to interact and produce the desired tetramer.

Figure 2 illustrates an arrangement of apparatus for polymerizing propylene in a manner such as to yield given quantities of both tetramer and lower boiling polymers during a given period of operation. In commercial practice it is often desired to produce during each month, for example, a certain quantity of tetramer to be used in detergent manufacture and also a certain quantity of dimers and trimers for use in making motor fuel. The procedure according to the invention involves a cyclic operation each cycle of which includes the previously specified series of sequential steps. The purpose of the procedure is to secure best utilization of the catalyst before its activity has declined to a level at which it must be replaced or regenerated, while at the same time minimizing the number of changes in operating condition employed in the reaction zones during a cycle.

Referring to Figure 2, the propylene charge entering the system through line 20 is split, as described in connection with Figure 1, into two streams one of which usually constitutes 75–95% of the charge. This stream passes through line 21 and valve 22 into reaction zone A. The phosphoric acid catalyst in zone A has already been in use in the system for a time and consequently has a relatively low average activity. During this phase of the operation the catalyst in zone A is maintained at a relatively low hydration level corresponding to such hydrations as results only from the water normally present in the propylene charge. The reaction temperature substantially throughout zone A is maintained within the range of 360–390° F., preferably 375–385° F. These operating conditions are effective, as described with reference to Figure 1, to produce mainly dimer and trimer products suitable for further conversion to tetramer in zone B.

The effluent passing from zone A through line 23 is sent through valve 24 and lines 25 and 26 to zone B, valve 27 being closed at this time. The remainder of the propylene charge from line 20 passes through line 28 and valve 29 and enters zone B along with the effluent from zone A. Zone B contains catalyst which has not been in use as long as that in zone A and which accordingly has a relatively high average activity, and this catalyst is maintained at a relatively high hydration level by continuous introduction of a small amount of water (at least 1 vol./10,000 vols. of hydrocarbons) through valve 30 and line 31. The temperature substantially throughout zone B is held within the range of 420–475° F., preferably 430–450° F. These conditions are effective to cause the propylene to react with the intermediate polymers from zone A and produce mainly tetramer product.

The effluent from zone B passes through line 32, valve 33 and line 34 to distillation zone 35 from which C₃ hydrocarbon, including propane and any unreacted propylene, is removed overhead through line 36. The bottoms from distillation zone 35 are sent through valve 47 and line 37 to distillation zone 38 wherein the dimer and trimer products are separated as a distillate stream which is removed by means of line 39. The residue from this second distillation passes through line 40 to distillation zone 41 for separation of the tetramer product from minor amounts of heavy polymer formed during the reaction.

Operation in the foregoing manner is continued until the average activity of the catalyst in zone A has reached an uneconomic level. At that time the operation of zone A is stopped and the catalyst therein is replaced with catalyst of relatively high activity or is regenerated in situ in any suitable manner. However, the operation of zone B is continued during this time by introducing propylene charge through line 28 and valve 29 at such rate that the full catalytic capacity of zone B is utilized to produce mainly dimer and trimer products for use as components of motor fuel. Introduction of water to zone (at least 1 vol./10,000 vols. of hydrocarbon) B by means of valve 30 and line 31 is continued in order to maintain the catalyst at a relatively high hydration level and the reaction temperature is kept within the range of 390–475° F. Preferably the reaction temperature during this phase is maintained somewhat lower than during the previous operational phase, most preferably within the range of about 400–410° F. These conditions are the most effective for producing mainly dimer and trimer products suitable for motor fuel manufacture. The effluent from zone B passes through line 34 to distillation zone 35 for removal of $C_3$ hydrocarbon. The polymer product may be withdrawn from the bottom of zone 35 through valve 49 for use in making motor fuel.

After zone A has been filled with catalyst of high activity, it is placed into operation on propylene charge alone in parallel with zone B. In other words, the operation of zone B is continued as last specified and propylene charge is introduced through line 21 and valve 22 to zone A. Valve 24 is kept closed and the efflux from zone A passes through line 23, valve 27 and line 42 to join the efflux from zone B. Conditions of operation in zone A at this time include maintenance of a high degree of catalyst hydration by introduction of water through valve 43 and line 44 and maintenance of the reaction temperature within the range of 390–475° F., preferably at about 400–410° F.

The parallel operation of zones A and B is continued until a predetermined quantity of dimer and trimer product for motor fuel use has been obtained. At such time the operation is changed to produce mainly tetramer product. This is done by dropping the temperature in zone B to within the range of 360–390° F. and lowering its catalyst hydration by discontinuing the addition of water through valve 30 and line 31. Preferably 75–95% of the total propylene charge is sent through line 28 and valve 29 to zone B. Valve 33 is closed and valve 45 is opened so that the efflux from zone B passes through line 46 and is mixed with the remaining part of the propylene charge which flows through line 21 to reaction zone A. The addition of water through line 44 is continued so as to maintain a relatively high catalyst hydration and the temperature in zone A is regulated to within the range of 420–475° F. The resulting product from zone A thus is composed mainly of tetramer and is sent through valve 27 and lines 42 and 34 to the distillation zones for separation as previously described.

When the activity of the catalyst in zone B has dropped to an uneconomic level, zone B is taken out of operation and the catalyst therein is replaced with catalyst of high activity. The operation of zone A is continued without change in hydration conditions and with the temperature within the range of 390–475° F. by reacting therein propylene charge alone at such rate that the full catalytic capacity of zone A is utilized to produce mainly dimer and trimer products as motor fuel components. After the catalyst in zone B has been replaced, this zone is again put into operation in parallel with zone A by introducing thereto propylene charge. The catalyst in zone B is maintained at relatively high hydration by introduction of water through valve 30 and line 31 and the temperature of reaction is maintained within the range of 390–475° F. Preferably the temperatures in both zones A and B are adjusted to about 400–410° F. for best operation in producing motor fuel components. Such parallel operation is continued until a predetermined quantity of dimer and trimer products has been obtained at which time a full cycle of operation has been completed. Thereafter another cycle of operation is conducted in the same manner as the previous cycle.

In the operation as above described considerable variation in such conditions as feed compositions, space velocity, pressure, catalyst activity and the like may occur without unduly affecting the desired reactions. Regardless of these other specific reaction conditions, however, the temperatures must be maintained within the particular ranges specified for the several phases of operation, and likewise the specified hydration conditions must be observed. Generally, the pressures within reaction zones A and B should be above the critical pressure of the feed but ordinarily should not exceed 1500 pounds per square inch. A preferred pressure range for each of the reaction zones in each step of the operation is about 1000–1200 pounds per square inch. Suitable space velocities for conducting the reactions are within the range of 0.15–0.75 gallon of liquid charge per hour per pound of catalyst. As previously indicated, it is preferable to utilize a $C_3$ feed stock having a propylene content within the range of 25–60%. The catalyst, as is apparent from the preceding description, varies considerably in activity as it becomes spent during the course of the sequential operation.

This application is a continuation-in-part of my copending application Serial No. 207,814, filed January 25, 1951, now abandoned.

I claim:

1. Method of conducting a polymerization operation with a plurality of polymerization zones to produce propylene tetramer and lower boiling propylene polymers from a propylene charge which method comprises the following sequential operational phases: (1) introducing 50–95 parts of the propylene charge into a polymerization zone A and therein reacting the propylene at a temperature maintained substantially throughout the zone within the range of 360–390° F. in the presence of a phosphoric acid catalyst of relatively low average activity and without separate addition of water to the reactant, introducing the effluent from zone A, together with 5–50 additional parts of propylene charge and with water added in amount of at least about one liquid volume per 10,000 liquid volumes of total hydrocarbon introduced, into a polymerization zone B and therein reacting the mixture at a temperature maintained substantially throughout the zone within the range of 420–475° F. in the presence of a phosphoric acid catalyst of relatively high average activity to yield mainly propylene tetramer; (2) stopping the operation of zone A and replacing the catalyst therein with catalyst of relatively high average activity while continuing the operation of zone B by reacting therein propylene charge, containing water added in amount of at least about one liquid volume per 10,000 liquid volumes of total hydrocarbon introduced, at a temperature maintained substantially throughout the zone within the range of 390–475° F. to yield mainly dimer and trimer products, then operating zones A and B in parallel by reacting in each propylene charge under the conditions just specified for zone B to yield mainly dimer and trimer products; (3) then, when the catalyst activity in zone B has become relatively low, conducting the operation of zones A and B so that each operates in the manner of, and under the conditions specified for, the other zone in phase (1); and (4) thereafter conducting the operation such that each of zones A and B operates in the manner of, and under the conditions specified for, the other zone in phase (2).

2. Method according to claim 1 wherein 75–95 parts of the propylene charge are introduced to zone A and 5–25 parts are introduced to zone B during phase (1), the reaction temperatures in zones A and B during phase (1) are, respectively maintained at approximately 375–385° F. and 430–450° F., and the reaction temperatures in zones A and B during phase (2) are each maintained at approximately 400–410° F.

References Cited in the file of this patent

UNITED STATES PATENTS

| | | |
|---|---|---|
| 2,245,143 | Gerhold | June 10, 1941 |
| 2,415,951 | Kirkbride et al. | Feb. 18, 1947 |
| 2,572,724 | Hinds et al. | Oct. 23, 1951 |